March 29, 1955 P. A. HARTER 2,705,058
MAGNETIC TORQUE PRODUCING DEVICE
Filed Nov. 30, 1953 3 Sheets-Sheet 1
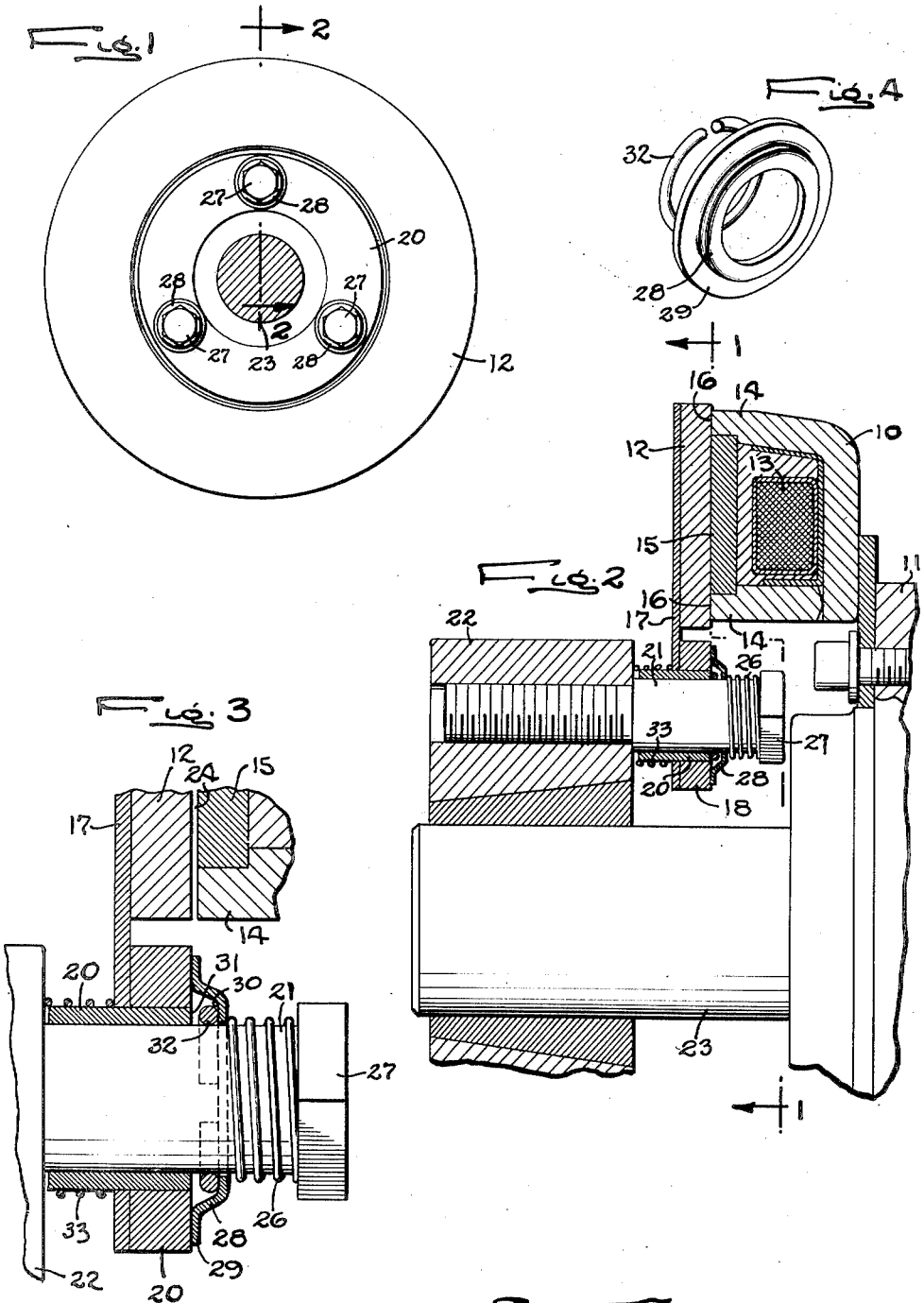

March 29, 1955  P. A. HARTER  2,705,058
MAGNETIC TORQUE PRODUCING DEVICE
Filed Nov. 30, 1953  3 Sheets-Sheet 2
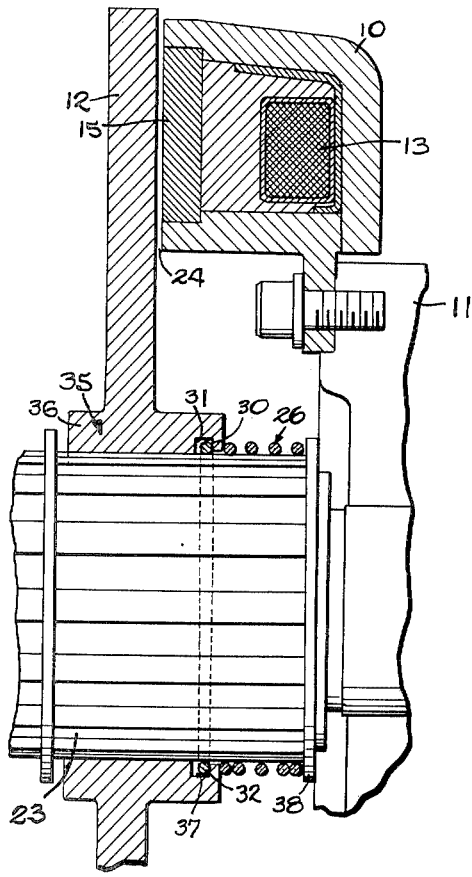
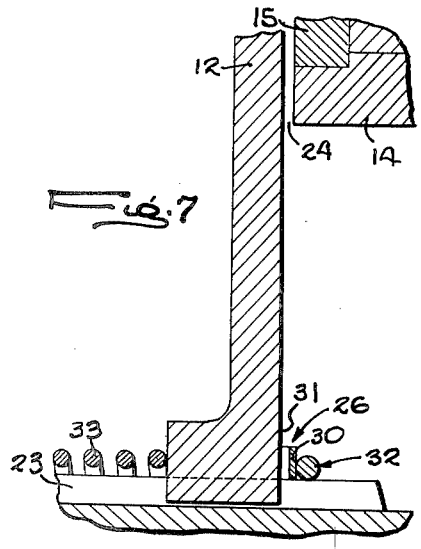
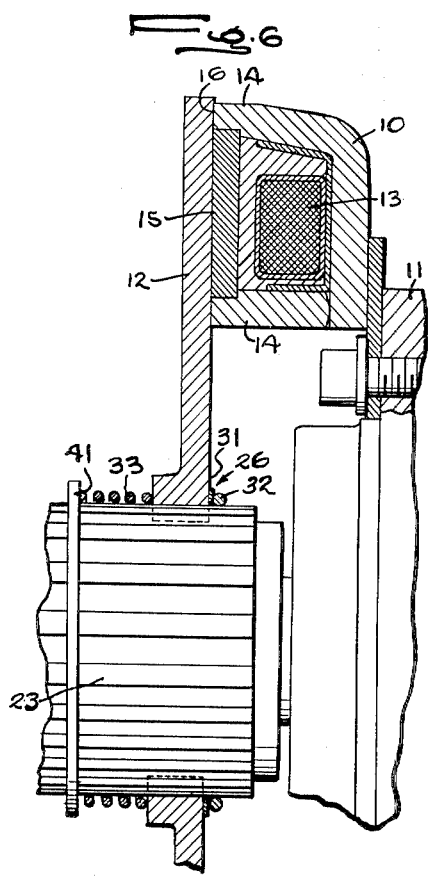
INVENTOR
Paul A. Harter
By Carlson, Pitzner, Hubbard + Wolfe
ATTORNEY March 29, 1955   P. A. HARTER   2,705,058
MAGNETIC TORQUE PRODUCING DEVICE
Filed Nov. 30, 1953   3 Sheets-Sheet 3
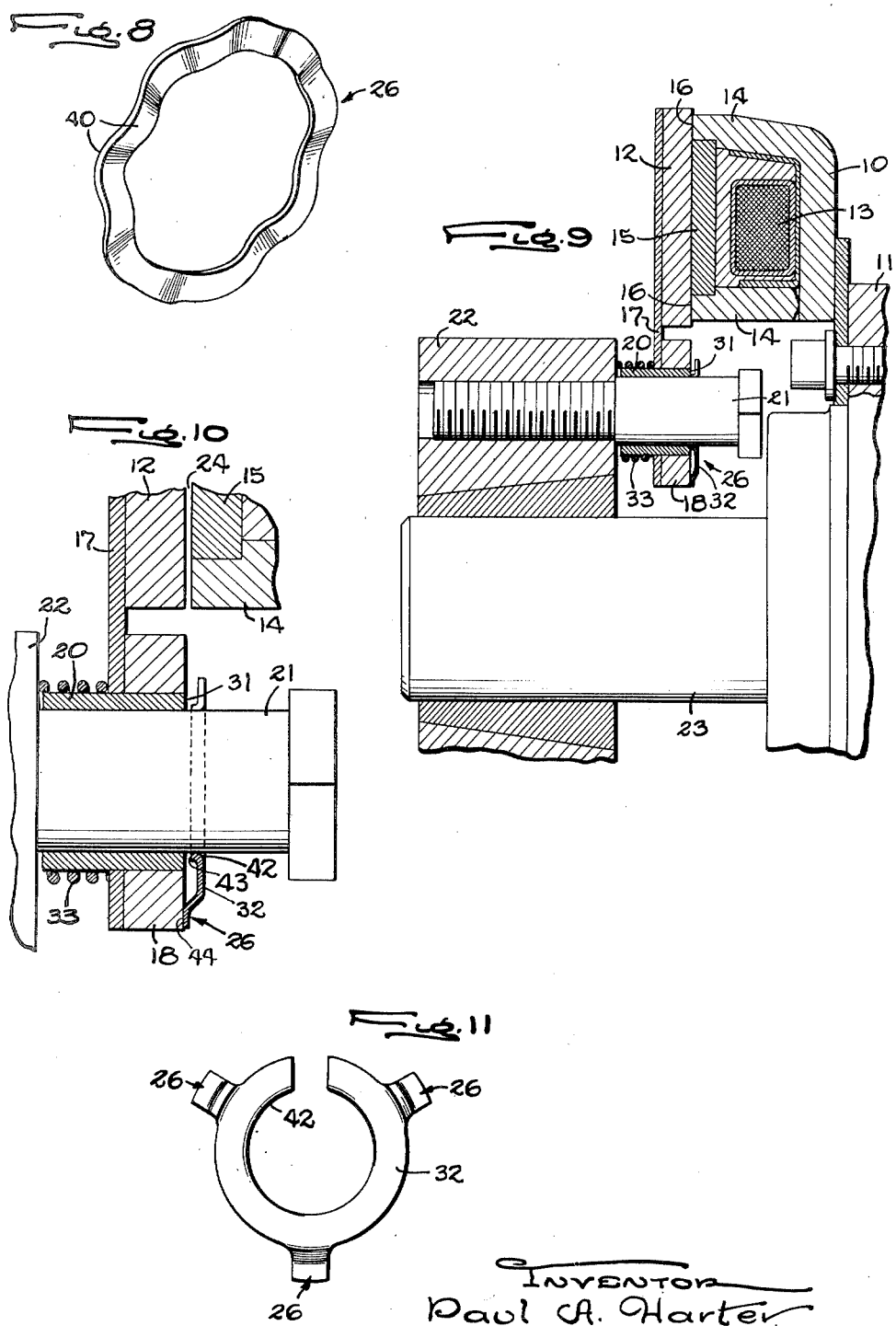

United States Patent Office 2,705,058
Patented Mar. 29, 1955

2,705,058

MAGNETIC TORQUE PRODUCING DEVICE

Paul A. Harter, Beloit, Wis., assignor to Warner Electric Brake & Clutch Company, South Beloit, Ill., a corporation of Illinois Application November 30, 1953, Serial No. 394,914

17 Claims. (Cl. 188—164)

This invention relates to magnetic torque producing devices such as friction brakes and clutches of the type in which annular magnetic rings are brought into axial gripping engagement with each other or released from such engagement by magnetization and demagnetization of the rings produced by controlling the flow of current in a winding associated with one of the rings.

For certain installations using such friction clutches or brakes, it is desirable to maintain the friction faces out of rubbing contact with each other while the clutch or brake is released.

One object of the invention is to maintain a narrow gap of substantially uniform width between the magnet rings when the latter are demagnetized through a novel mounting of one of the rings coacting with a shiftable stop for limiting the separation of the rings under the action of a resilient separating element or release spring.

Another object is to limit the axial separation of the magnetic rings through a novel coaction between the stop and abutments associated with the slidable magnet ring and the release spring.

Other objects and advantages of the invention will become apparent from the following detailed description taken in connection with the accompanying drawings, in which:

Figure 1 is an elevational view along the line 1—1 of Fig. 2 of part of an electromagnetic friction device embodying the novel features of the present invention.

Figs. 2 and 3 are fragmentary sectional views taken along the line 2—2 of Fig. 1 and showing different positions of the parts.

Fig. 4 is a perspective view of certain of the parts.

Fig. 5 is a view similar to Fig. 3 of a modified form of the invention.

Figs. 6 and 7 are views similar to Figs. 2 and 3 of another modified form of the invention.

Fig. 8 is a perspective view of one of the parts of the modification of Figs. 6 and 7.

Figs. 9 and 10 are views similar to Figs. 2 and 3 of a further modification of the invention.

Fig. 11 is an elevational view of a part of the modification of Figs. 9 and 10.

In the drawings, the invention is shown for purposes of illustration incorporated in an electromagnetic friction brake comprising a generally annular magnet ring 10 bolted to a stationary support 11 and a rotary armature ring 12 adapted to be drawn into axial gripping engagement with the magnet upon energization of a multiple turn coil 13 disposed between the magnet pole pieces 14. The magnet ring 10 is of U-shaped cross-sectional, and the pole pieces are spanned by wear resistant material 15 whose outer surface is flush with the pole faces 16 of the magnet.

The armature ring overlaps the pole faces 16 and may comprise a series of segments or a solid flat ring of magnetic material as shown secured as by welding to a disk 17 projecting inwardly from the armature and welded to a collar 18. The latter is apertured at annularly spaced points to receive bearing bushings 20 rigid with the collar and disposed parallel to the axis of the magnet rings. To support the armature for free axial sliding movement toward and away from the magnet ring 10, shouldered pins 21 project along the axis of the rings and through the bushings 20 and thread into a support 22 which is axially fixed relative to the magnet ring 10 and rotates with a shaft 23 or other part to which the retarding torque is to be applied.

When the magnet winding 13 is energized with the armature 12 separated from the magnet face by a narrow gap 24 (see Fig. 3), the magnetic flux threading the circuit around each part of the magnet will cause the two rings to be drawn into axial gripping engagement as shown in Fig. 2. A frictional torque proportional to the energizing current is thus exerted on the rotary part 23. When the current flow is interrupted, the armature is free to slide along the pins 21 and away from the magnet as a result of dissipation of the residual magnetic flux to a low value due to a high reluctance gap which preferably is provided in the flux circuit.

In accordance with the present invention, provision is made for moving the armature 12 away from the magnet when the latter is deenergized while always maintaining the gap 24 of a fixed width in spite of the wearing off of the friction faces of the rings 10 and 12 in service use. The force for thus moving the armature, in the preferred form of the invention shown in Figs. 1 to 4 is produced by axially yieldable resilient elements in the form of compression springs 26 coiled about the inwardly projecting end portions of the pins 21 and bearing at one end against the heads 27 on these pins. These heads provide abutments fixed relative to the shaft 23 and facing axially in the direction of separating movement of the armature. Herein, the other ends of the springs bear axially against the outer surface of dished washers 28 encircling the pins 21 with their outer offset peripheral portions 29 bearing against the collar 18. The other sides 30 of the washers provide axially facing abutments which, when the washers are abutting against the collar 18, are spaced axially from the latter and opposed abutments 31 formed by the inner ends of the bushings 20.

The extent of movement of the armature away from the magnet under the influence of the release springs 26 is determined by stops 32 engaged axially by the abutments 30 and supported for axial movement against a frictional resistance sufficient to overcome the force of the springs and thus limit the range of separation of the magnet rings. In the present instance, each stop 32 takes the form of a split ring of resilient wire material encircling the major portion of one of the pins 21 and contracted tightly around the latter between the abutments 30 and 31. The latter are spaced apart a distance equal to the axial thickness of the stop ring 32 plus the desired width of the gap 24 which may be on the order of 1/64 of an inch.

Provision is made for holding the armature ring 12 against drifting away from the stop 32 when the brake is idle. This is accomplished in the preferred form of the invention shown in Figs. 1 to 4 by employing compression springs 33 lighter than the release springs 26 and coiled about the bushings 20 so as to bear at one end against the armature supported 22 and at their other ends against the disks 17. The follow-up springs 33 thus urge the armature assembly along the pins 21 and toward the magnet face 16 to hold the collar 18 in abutment with the washers 28 at all times. Each of the springs 33 is adapted to exert a force of about ½ pound as compared to the 2 to 4 pounds force of each spring 26.

When the magnet coil 13 is deenergized, the springs 26 hold the washers 28 firmly against the stops 32 thus spacing the armature face the desired distance away from the magnet face as shown in Fig. 3. Since the armature collar is held in abutment with the washers by the lighter springs 33, the width of the gap 24 will remain constant in spite of the vibration or other service conditions which might be conducive to drifting of the armature away from the magnet.

Now, when the magnet winding is energized and the armature is slid along the pins 21 and drawn into gripping engagement with the magnet face, the abutments 31 will engage the stop rings 32. The resistance offered by the friction between the stops 32 and their supporting surfaces is made less than the magnetic attractive force between the magnetic rings 10 and 12 so that, if the friction faces of the magnetic rings become worn off to any appreciable extent during application of the brake, the stops will be shifted along the pins 21 a distance equal to the amount of the wear. The new positions of the stops will be retained by their frictional gripping of the pins 21 so that in the next release of the brake the movement of the armature 12 away from the magnet will be limited at the new position of the stops. As the result of this automatic readjustment of the stop position during each engagement of the brake, the width of the gap 24 will be maintained constant at all times irrespective of the wearing off of the friction faces of the magnetic rings.

It is noted that, in the preferred construction of Figs. 1 to 4, the abutments 31 on the armature 12 act directly on the stops 32 so that the latter are positioned positively by the armature. Since the armature, the stops, and the release springs 26 engage each other axially in abutting relationship, wearing off of these parts due to sliding along their supports does not affect accurate spacing of the magnet and armature rings. Such simple abutting engagement between these parts also avoids any tendency of the same to become wedged or locked together.

One modified form of the invention shown in Fig. 5 is characterized by axial compactness and simplicity in the omission of the follow-up springs 33 which prevent drifting of the armature 12 away from the stop 32 when the brake is deenergized. In this modified construction, the armature is mounted directly on the shaft 23 as by a spline connection 35 between the latter and a hub 36 rigid with the inner periphery of the armature ring. The opposed axially facing abutments 30 and 31 are formed as two walls of an annular groove 37 opening inwardly from the inner periphery of the hub and encircling the shaft 23.

As in the preferred construction of Figs. 1 to 4, the stop 32 shown in Fig. 5 is a split ring of resilient material disposed between and engageable axially with the abutments 30 and 31 and the latter are spaced apart a distance equal to the thickness of the stop plus the desired width of the air gap 24. The stop ring is contracted around and frictionally grips the shaft 23 and coacts with the armature, the abutments 30 and 31 thereon, and the release spring 26 in the manner described above to maintain the length of the air gap constant regardless of wear on the friction faces of the brake. The release spring 26 which urges the armature axially away from the magnet 10 and the abutment 30 against the stop 32 in this modification is a coiled compression spring encircling the shaft 23 and acting between the armature hub 36 and an axially facing abutment on the shaft defined herein by one side of a snap ring 38 seated in an annular groove in the shaft.

In the modified construction of Figs. 6 to 8, the armature 12 is splined on the shaft 23 and the stop 32 is a ring encircling and frictionally gripping the shaft as in the construction of Fig. 5. The abutment 31 on the armature 12, however, instead of acting directly against the stop 32 to shift the latter along the shaft 23 as the friction faces of the armature and the magnet become worn, acts indirectly through the intermediary of the release spring 26 which is disposed between the abutment 31 and one side of the stop ring 32 forming the abutment 30 and which, like the release springs 26 of the forms described above, urges the armature axially away from the magnet 10. The release spring 26, when compressed axially between the stop 32 and the abutment 31 by an amount equal to the desired width of the air gap 24 (Fig. 7), has sufficient strength to overcome the friction on the stop and shift the latter along the shaft 23 to compensate for wear on the friction faces of the magnet and armature rings. In the present instance, the release spring 26 is an axially compressible serpentine spring formed as an annulus having axial corrugations 40 and a fixed axially compressed length (see Fig. 6) differing from its free or axially expanded length (see Fig. 7) by an amount equal to the desired length of the air gap 24. A follow-up spring 33 weaker than the release spring and acting between the armature and a snap ring 41 seated in a groove in the shaft urges the armature into engagement with the release spring when the coil is deenergized.

As in the constructions described above, the stop 32 of Figs. 6 to 8, is supported herein on the shaft 23, for axial movement against a frictional resistance sufficient to overcome the release spring 26 but insufficient to resist the magnetic attractive force between the magnet and armature rings 10 and 12 when the coil 13 is energized. Thus, under the latter condition, the armature is drawn into gripping engagement with the magnet and the serpentine release spring 26 is flattened axially between the abutment 31 on the armature and the opposed side 30 of the stop 32, so that the stop is shifted along the shaft as the friction faces wear during application of the brake. Following such shifting and while the coil 13 remains energized, the frictional resistance between the stop and the shaft overcomes the release spring and the latter remains compressed between the abutments 30 and 31. Such axial compression of the serpentine spring is accompanied by an increase in the diameter of the ring so that a small radial gap appears between the latter and the shaft 23 as shown in Fig. 6. As soon as the coil is deenergized, the release spring expands to its full axial length against the action of the follow-up spring 33 to space the armature the desired distance from the magnet as shown in Fig. 7.

If desired, the release spring 26 and the stop 32 may be formed as a single part as shown in Figs. 9 to 11 in which the armature 12 is supported on the pins 21 as in Figs. 1 to 3 for axial sliding movement toward and away from the magnet 10. One stop 32 encircles each pin and is formed as a flat split ring stamped from sheet metal and having an inturned flange 42 around its inner periphery frictionally gripping the pin. An abutment 43 on the projecting end of the flange faces axially toward and engages the abutment 31 on the armature when the latter grips the magnet.

The release spring 26 takes the form of a plurality of angularly spaced and axially yieldable fingers projecting radially and outwardly from the outer periphery of the stop ring 32. At their outer end portions, the fingers provide abutments 44 which engage the armature abutment 31 axially and which, when the coil 13 is deenergized so that the fingers are free to move axially, are offset from the abutment 43 on the flange 42 and toward the armature abutment 31 by an amount equal to the desired width of the air gap 24 as shown in Fig. 10. The follow-up spring 33 which is weaker than the release spring fingers acts between the support 22 and the armature to avoid drifting of the latter away from the abutments 44 on the fingers.

When the coil 13 of Figs. 9 and 10 is energized and the armature 12 is drawn into gripping engagement with the magnet 10, the release spring fingers 26 are bent or compressed axially until the armature abutment 31 engages the flange abutment 43 and the abutments 44 on the spring fingers are flush with the flange abutment. The stop 32 retains its position against the action of the spring fingers because the frictional resistance between the stop and the pin 21 is made greater than the force exerted by the fingers. This frictional resistance, however, is less than the attractive force between the magnetic rings produced by energization of the coil so that, if the friction faces of the magnetic rings become worn during application of the brake, the stop 32 will be shifted axially a distance equal to the amount of the wear. Upon deenergization of the coil, the spring fingers flex to their free or axially expanded positions shown in Fig. 10 and, acting between the stop 32 and the armature, separate the latter from the magnet by the desired air gap width which is equal to the difference between the axially expanded and compressed lengths of the spring fingers. As in the other forms of the invention described above, the width of the air gap will be maintained constant at all times due to the automatic readjustment of the stop 32 during each application of the brake.

It will be apparent that, in all forms of the invention described above, the frictional resistance between the stop 32 and its supporting surface is greater than the force exerted by the release spring 26 but less than the magnetic attractive force between the magnet and armature rings 10 and 12 produced by energization of the coil 13. By virtue of this correlation of forces, the parts may engage each other in simple axial abutting relationship so as to avoid wedging of the parts and inaccuracies resulting from sliding of the parts on their supporting surfaces.

This application is a continuation-in-part of my copending application, Serial No. 237,430 filed July 18, 1951, now abandoned.

I claim as my invention:

1. In a magnetic torque producing friction device, the combination of, two annular rings of magnetic material having opposed axially facing friction faces, means supporting one of said rings in axially fixed position, a plurality of axially fixed and angularly spaced parallel pins supporting the other ring for axial movement into and out of gripping engagement with the face of said axially fixed ring, means operable when activated to produce a magnetic flux threading through said rings to attract the latter into frictional gripping engagement, abutment surfaces movable axially with said other ring and facing axially in the direction of separating movement of the other ring, springs each coiled around one of said pins and yieldably urging said other ring away from said fixed ring, and a plurality of stops each comprising a resilient member contracted around and frictionally gripping one of said pins and having an abutment facing axially toward and engageable with one of said abutment surfaces to limit the movement of said other ring away from said fixed ring under the action of said springs.

2. In a magnetic torque producing friction device, the combination of, two annular rings of magnetic material having opposed axially facing friction faces, means slidably supporting one of said rings for axial movement toward and away from the other ring including an element extending along the axis of the rings, means operable when activated to produce a magnetic flux threading through said magnetic rings to attract the latter into frictional gripping engagement, a resilient member contracted around said supporting element and engageable by the slidable ring in its movement toward said other ring, a part movable with said slidable ring and disposed on the side of said member opposite the slidable ring to engage the member in the movement of the part away from said other ring, and a spring coiled around said supporting element and acting against said part to urge the latter and said slidable ring away from said other ring and against said member.

3. In a magnetic torque producing friction device, the combination of, two annular rings of magnetic material having opposed axially facing friction faces, means slidably supporting one of said rings for axial movement into and out of abutment with the face of the other ring including a member projecting through one of the rings, a ring of resilient material encircling and contracted around said member to grip the latter frictionally, means on said slidable ring providing two opposed axially facing abutments disposed on opposite sides of the resilient ring and spaced apart a distance greater than the axial thickness of the ring whereby to limit the axial sliding of said slidable ring, means operable when activated to produce a flux threading through said magnetic rings to attract the slidable ring into frictional gripping engagement with said other ring, and means resiliently urging said slidable ring in a direction away from its coacting magnetic ring with a force less than the frictional resistance of said resilient ring whereby to separate said magnetic rings when said flux producing means is deactivated.

4. In a magnetic torque producing friction device, the combination of, two annular rings of magnetic material having opposed axially facing friction faces, means slidably supporting one of said rings for axial movement into and out of abutment with the face of the other ring, means operable when activated to produce a magnetic flux threading through said rings to attract said slidable ring into frictional gripping engagement with said other ring, two opposed abutments movable with said slidable ring and axially spaced apart a distance determined by the desired separation of said magnet rings when the latter are deenergized, spring means urging said slidable ring axially and away from the other ring, and a stop supported between said abutments and frictionally gripping its supporting surface with a force sufficient to overcome said spring and thereby limit the outward movement of the slidable ring under the action of the spring while being shiftable to permit attraction of the two rings together when said flux producing means is activated.

5. In a magnetic torque producing friction device, the combination of, two annular rings of magnetic material having opposed friction faces adapted for axial gripping engagement, means slidably supporting one of said rings for axial movement into and out of frictional gripping engagement with the face of the othe ring, means operable when activated to produce a magnetic flux to attract said slidable ring into frictional gripping engagement with said other ring, said slidable ring providing an abutment facing axially in its direction of advance toward the other ring, a part movable with and abutting against said slidable ring and providing a second abutment opposing and axially spaced from said first abutment, a spring urging said part and said slidable ring together, a stop supported between said abutments and frictionally gripping its supporting surface, and a spring stronger than said first spring and urging said slidable ring away from the second ring with a force insufficient to overcome the frictional resistance of said stop.

6. In a magnetic torque producing friction device, the combination of, two rings of magnetic material having opposed friction faces adapted for axial gripping engagement, means supporting said rings for axial movement relative to each other into and out of gripping engagement through a narrow limited range, magnetic flux producing means operable when activated to create a force attracting said rings into axial gripping engagement, spring means normally urging said rings apart axially, a stop limiting the distance through which said rings may be separated under the action of said spring means, and means supporting said stop for movement axially of said rings against a frictional resistance of sufficient magnitude to overcome said spring means but insufficient to overcome the magnetic attraction between said rings when said flux producing means is activated.

7. In a magnetic torque producing friction device, the combination of, two rings of magnetic material having opposed axially facing friction faces, means supporting said rings for axial movement relative to each other into and out of gripping engagement, spring means normally urging said rings apart axially, a stop limiting the range of axial movement of said rings away from each other under the action of said spring means, flux producing means operable when activated to create a magnetic force attracting said rings into axial gripping engagement, means supporting said stop for movement axially of said rings as the latter come into full engagement upon activation of said flux producing means following wearing off of the ring surfaces, and means creating between said stop and said supporting means thereof sufficient friction to overcome said spring means but insufficient to resist the force of magnetic attraction between said rings when said flux producing means is activated.

8. In a magnetic torque producing device, the combination of, two annular rings of magnetic material adapted to be drawn into and released from axial gripping engagement by magnetic energization and deenergization of the rings, a shaft extending axially through a first one of said rings, a hub on said first ring splined on said shaft for axial sliding movement of the first ring into and out of engagement with the friction face of the other ring, a resilient element yieldably urging said rings axially away from each other when said rings are deenergized, means on said hub including opposed axially facing walls defining an annular inwardly opening groove encircling said shaft, and a stop in the form of a ring of resilient material disposed within said groove and contracted around said shaft to grip the latter frictionally, one of said walls engaging said stop to limit axial separating movement of said first ring under the action of said resilient element and the other of said walls engaging said stop in the subsequent movement of said rings toward each other and, during wearing off of the friction faces of the rings, shifting the stop along said shaft a distance equal to the amount of such wear.

9. In a magnetic torque producing device, the combination of, two annular rings of magnetic material having opposed axially facing friction faces adapted for axial gripping engagement, means supporting said rings for relative axial movement into and out of engagement with each other including a shaft fixed against axial movement relative to one of said rings and shiftable axially relative to the other ring, flux producing means operable when activated to create a force attracting said rings into axial gripping engagement, resilient means yieldably urging said rings axially away from each other, means on said other ring including opposed axially facing abutments defining an annular inwardly opening groove encircling said shaft, and a ring of resilient material disposed within said groove and contracted around said shaft to grip the latter frictionally with a force sufficient to overcome said resilient means and thereby limit the separating movement of said other ring while being shiftable along said shaft to permit attraction of the two rings together upon activation of said flux means.

10. A magnetic torque producing device having, in combination, two rings of magnetic material having opposed axially facing friction faces and adapted to be drawn into and separated from axial gripping engagement by magnetic energization and deenergization of the rings, a member projecting into and supporting one of said rings for axial sliding of the latter into and out of engagement with the friction face of the other ring, said slidable ring having an abutment thereon facing in a direction opposite to said friction face, a stop in the form of a ring of resilient material encircling and contracted around said member to grip the latter frictionally, a resilient element encircling said member and axially compressed between said abutment and said stop so as to urge said rings apart and provide a narrow gap between the friction faces of said rings when the latter are deenergized, said element having predetermined axially compressed and expanded lengths whose difference equals the desired width of said gap and, when compressed, having sufficient strength to overcome the friction on said stop and slide the latter along said member when the rings are drawn into engagement and during wearing off of said friction faces, and resilient means weaker than said resilient element yieldably urging said slidable ring axially into engagement with the element.

11. In a magnetic torque producing device, the combination of, two annular rings of magnetic material having opposed axially facing friction faces, means supporting said rings for axial movement relative to each other into and out of gripping engagement, flux producing means operable when activated to produce a magnetic force to attract said rings into gripping engagement, a first abutment on a first one of said rings facing axially in a direction opposite to the friction face of the other ring, a second abutment opposed to and facing axially toward said first abutment, an axially yieldable resilient element acting between said abutments to urge said first ring axially away from said other ring and having a free axially expanded length differing from its axially compressed length by an amount equal to the desired spacing between the rings when said flux means is deactivated, and means supporting said second abutment for movement axially of said rings against a frictional resistance sufficient to overcome said resilient element but insufficient to overcome said magnetic force.

12. A magnetic torque producing device having, in combination, two relatively rotatable rings of magnetic material adapted to be drawn into and released from axial gripping engagement by magnetic energization and deenergization of the rings, a member projecting into and supporting one of said rings for axial sliding of the latter into and out of engagement with the friction face of the other ring, a stop in the form of a ring of resilient material encircling and contracted around said member to grip the latter frictionally, opposed first and second abutments on opposite sides of said stop movable with said slidable ring and axially spaced apart more than the axial thickness of said stop by an amount corresponding to the width of the gap to be maintained between said friction rings when deenergized, a third abutment on said member axially spaced from said first abutments, and an axially compressed resilient element encircling said member and acting against said third abutment when said rings are deenergized to move said second abutment and said slidable ring away from the other ring to a position limited by engagement of the second abutment with said stop, said first abutment engaging said stop during the latter part of the engaging movement of said slidable ring and operable to shift said stop axially by an amount equal to the wearing off of said friction faces during engagement of said rings.

13. A magnetic torque producing device having, in combination, two relatively rotatable rings of magnetic material adapted to be drawn into and released from axial gripping engagement by magnetic energization and deenergization of the rings, a member projecting into and supporting one of said rings for axial sliding of the latter into and out of engagement with the friction face of the other ring, a stop in the form of a ring of resilient material encircling and contracted around said member to grip the latter frictionally, an axially yieldable resilient element acting when said rings are deenergized and with a force less than the frictional resistance between said stop and said member, to move said slidable ring away from the other friction ring by an amount determined by the prevailing position of said stop whereby to provide a narrow gap between the friction faces of said rings, and an abutment rigid with said slidable ring and normally spaced from said stop, when said friction rings are separated, by an amount equal to the desired width of said gap, said abutment, during wearing off of said friction faces, engaging said stop in the movement of said rings toward each other and shifting said stop along said member a distance equal to the amount of such wear.

14. A magnetic torque producing device having, in combination, two relatively rotatable rings of magnetic material having opposed friction faces and adapted to be drawn into and released from axial gripping engagement by magnetic energization and deenergization of the rings, a member supporting one of said rings for axial sliding of the latter into and out of engagement with the friction face of the other ring, axially yieldable resilient means urging said slidable ring axially away from said other ring, a first pair of abutments movable with said slidable ring and facing axially in opposite directions therefrom, a stop frictionally gripping and slidable axially relative to said member and having a second pair of oppositely facing abutments one engageable axially with one of said first pair of abutments to limit axial separating movement of said slidable ring to a predetermined range under the action of said resilient means and the other engageable axially with the other of said first pair of abutments to slide the stop axially along said member when the rings are drawn into engagement and during wearing off of said friction faces, and means creating between said stop and said member sufficient friction to overcome said resilient means but insufficient to overcome the magnetic attractive force between said rings when the latter are energized.

15. A magnetic torque producing device having, in combination, two relatively rotatable rings of magnetic material having opposed axially facing friction faces and adapted to be drawn into and separated from axial gripping engagement by magnetic energization and deenergization of the rings, a member projecting into and supporting one of said rings for axial sliding of the latter into and out of engagement with the friction face of the other ring, said slidable ring having a first abutment thereon facing in a direction opposite to said friction face, a stop in the form of a ring of resilient material encircling and contracted around said member to grip the latter frictionally and having a second abutment facing axially toward said first abutment to engage the latter when said magnetic rings are drawn into gripping engagement, a plurality of axially yieldable and angularly spaced resilient fingers carried by and projecting radially from said stop and acting between the latter and said slidable ring to urge the latter away from said other ring, and abutments on said fingers facing axially toward and engageable with said first abutment and, when said magnetic rings are deenergized and the fingers are free to expand axially, offset axially toward the first abutment from said second abutment by an amount equal to the desired spacing between the magnetic rings, the frictional resistance between said stop and said member being sufficient to overcome the axial force exerted by said fingers but less than the magnetic attractive force between said rings when the latter are energized.

16. A magnetic torque producing device having, in combination, two relatively rotatable rings of magnetic material adapted to be drawn into axial gripping engagement by magnetic flux threading the rings, a member supporting one of said rings for axial sliding of the latter into and out of engagement with the friction face of the other ring, a stop frictionally gripping and slidable axially relative to said member, an axially yieldable resilient element acting, when said rings are deenergized, and with a force less than the frictional resistance between said stop and said member, to move the rings apart by an amount determined by the position of said stop and provide a narrow gap between the friction faces of the rings, and means including axially facing abutments on said slidable ring and said stop coacting when said rings are attracted together and during wearing off of said friction faces to overcome the friction on the stop and shift the latter along said member by the amount of the wear whereby to maintain said gap of substantially uniform width.

17. In a magnetic torque producing device, the combination of, two rings of magnetic material having opposed friction faces adapted for axial gripping engagement, means supporting said rings for axial movement relative to each other into and out of gripping engagement, axially yieldable resilient means normally urging said rings apart axially, flux producing means operable when activated to create a magnetic force attracting said rings into axial gripping engagement, a stop, means supporting said stop for movement axially of said rings against a frictional resistance of sufficient magnitude to overcome said resilient means but insufficient to overcome the magnetic attraction between the rings when said flux means is activated, and means including axially facing abutment surfaces on one of said rings, said resilient means and said stop coacting, when said flux means is deactivated, to separate said rings by an amount equal to said air gap width and, when said flux means is activated, to shift said stop along said supporting surface by an amount equal to the wearing off of said friction faces during engagement of the rings.

References Cited in the file of this patent

UNITED STATES PATENTS

| | | |
|---|---|---|
| 2,290,406 | Chambers | July 21, 1942 |
| 2,404,326 | Taylor | July 16, 1946 |
| 2,417,476 | Finley | Mar. 18, 1947 |
| 2,526,149 | Myers et al. | Oct. 17, 1950 |
| 2,562,788 | Hodgson | July 31, 1951 |